(12) United States Patent
Thakare et al.

(10) Patent No.: US 9,779,070 B2
(45) Date of Patent: *Oct. 3, 2017

(54) PROVIDING AGGREGATED DATA TO PAGE GENERATION CODE FOR NETWORK PAGE GENERATION

(71) Applicant: Amazon Technologies, Inc., Reno, NV (US)

(72) Inventors: Prashant J. Thakare, Mercer Island, WA (US); Andrew S. Huntwork, Seattle, WA (US); Jeremy Boynes, Mercer Island, WA (US); Shashank Shekhar, Bangalore (IN); Pravi Garg, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 265 days.

This patent is subject to a terminal disclaimer.

(21) Appl. No.: 14/479,786

(22) Filed: Sep. 8, 2014

(65) Prior Publication Data
US 2014/0380148 A1   Dec. 25, 2014

Related U.S. Application Data

(63) Continuation of application No. 13/363,761, filed on Feb. 1, 2012, now Pat. No. 8,832,225.

(51) Int. Cl.
*G06F 15/16* (2006.01)
*G06F 17/22* (2006.01)
(Continued)

(52) U.S. Cl.
CPC ...... *G06F 17/2252* (2013.01); *G06F 17/3089* (2013.01); *G06F 21/53* (2013.01);
(Continued)

(58) Field of Classification Search
CPC . G06F 21/53; G06F 2221/2149; H04L 63/10; H04L 63/105
See application file for complete search history.

(56) References Cited

U.S. PATENT DOCUMENTS 5,915,001 A * 6/1999 Uppaluru ............ H04M 3/4938
                                                  379/88.17
7,620,653 B1 * 11/2009 Swartz ............... G06F 17/30893
(Continued)

OTHER PUBLICATIONS

U.S. Appl. No. 13/348,069 entitled "Securing Execution of Customer-Supplied Network Page Generation Code," filed Jan. 11, 2012.
(Continued)

*Primary Examiner* — Shean Tokuta
(74) *Attorney, Agent, or Firm* — Thomas | Horstemeyer, LLP

(57) ABSTRACT

Disclosed are various embodiments relating to generating portions of network pages associated with a network site, where the portions of the network pages are generated by page generation code that uses a subset of aggregated data provided to it. A request for a network page is received from a first party. Data is aggregated from one or more data sources in response to the request. Each data source provides multiple data items using a multipart encoding. Page generation code supplied by the first party is executed to generate at least a portion of the network page in response to receiving a subset of the data which is used by the page generation code. The page generation code is able to access the subset of the data as predefined variables.

20 Claims, 5 Drawing Sheets

(51) Int. Cl.
 *G06F 21/53* (2013.01)
 *G06F 17/30* (2006.01)
 *H04L 29/06* (2006.01)
(52) U.S. Cl.
 CPC ...... *G06F 2221/2149* (2013.01); *H04L 63/10* (2013.01); *H04L 63/105* (2013.01)

(56) References Cited

U.S. PATENT DOCUMENTS

| | | | | |
|---|---|---|---|---|
| 8,250,215 | B2* | 8/2012 | Stienhans | G06F 9/5072 709/223 |
| 8,527,943 | B1* | 9/2013 | Chiluvuri | G06F 8/36 717/106 |
| 2002/0078158 | A1* | 6/2002 | Brown | H04L 12/583 709/206 |
| 2002/0165936 | A1* | 11/2002 | Alston | G06F 17/30893 709/217 |
| 2003/0188021 | A1* | 10/2003 | Challenger | G06F 17/30896 709/246 |
| 2004/0181609 | A1 | 9/2004 | Ullmann et al. | |
| 2004/0205555 | A1 | 10/2004 | Hind et al. | |
| 2007/0192215 | A1 | 8/2007 | Taylor et al. | |
| 2008/0043717 | A1* | 2/2008 | Bellora | H04M 7/0027 370/352 |
| 2009/0083294 | A1* | 3/2009 | Gao | G06F 17/2229 |
| 2009/0126002 | A1* | 5/2009 | Vail | H04L 63/0209 726/12 |
| 2012/0066586 | A1* | 3/2012 | Shemesh | G06F 17/30902 715/235 |

OTHER PUBLICATIONS

U.S. Appl. No. 13/363,770 entitled "Loading Customer-Supplied Network Page Generation Code," filed Feb. 1, 2012.
U.S. Appl. No. 13/363,782 entitled "Error Handling in a Network Page Generation Environment," filed Feb. 1, 2012.
U.S. Appl. No. 13/363,787 entitled "Data Contracts for Network Page Generation Code," filed Feb. 1, 2012.
U.S. Appl. No. 13/363,816 entitled "Network Site Hosting in a Managed Environment," filed Feb. 1, 2012.
U.S. Appl. No. 13/348,051 entitled "Generating Network Pages Using Customer-Supplied Generation Code," filed Jan. 11, 2012.
U.S. Appl. No. 13/348,088 entitled "Facilitating Access to Data in Network Page Generation Code," filed Jan. 11, 2012.
U.S. Appl. No. 13/348,081 entitled "Virtual File System for Hosted Network Sites," filed Jan. 11, 2012.
U.S. Appl. No. 13/348,059 entitled "Generating Network Pages Using Customer-Generated Network Page Portions," filed Jan. 11, 2012.
U.S. Appl. No. 13/347,953 entitled "Opportunistic Unloading of Network Applications," filed Jan. 11, 2012.

* cited by examiner

PROVIDING AGGREGATED DATA TO PAGE GENERATION CODE FOR NETWORK PAGE GENERATION

CROSS-REFERENCE TO RELATED APPLICATIONS

This application is a continuation of, and claims priority to, co-pending U.S. Patent Application entitled "MULTIPART ENCODING IN DATA AGGREGATION FOR NETWORK PAGE GENERATION," filed on Feb. 1, 2012 and assigned application Ser. No. 13/363,761, which is incorporated herein by reference in its entirety.

BACKGROUND

Network pages are becoming increasingly complex. While in the past network pages may have been static files, network pages now are typically dynamically generated by complex applications using data obtained from many different sources. As a non-limiting example, a network page for an online retailer may include information obtained from a product catalog application, a user information application, a shopping cart application, and/or other sources.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to data aggregation for the purpose of network page generation, and more specifically, the use of multipart encoding in the data aggregation. A multitude of data items may need to be fetched from different sources in order to generate a network page dynamically. In various embodiments, all of the data used in generating a network page portion is aggregated in advance of executing code that generates that network page portion. Advance data aggregation may be a requirement in embodiments involving hosted network sites that execute customer-provided network page generation code.

Latency is an important concern for network page generation, as perceived sluggishness in rendering may lead to user frustration. To this end, it is desirable to minimize latency in data aggregation. Parallelization is one strategy to reduce latency, and data may be fetched from multiple sources in parallel. However, each of the sources may take time to produce all of the requested data. It may be the case that a portion of a network page uses some, but not all, of the data produced by the source for use in the network page. Making multiple requests to a data source for specific items may result in unacceptable overhead.

Various embodiments of the present disclosure employ multipart encoding for data obtained from data sources to reduce latency in data aggregation. Multipart encoding allows the data aggregation logic to parse the results of a data request into multiple parts. When the data used by particular page generation code has been obtained, execution of the particular page generation code can begin, even if the data source is still streaming data to the data aggregation logic for use in generating the entirety of the network page. Consequently, generation of the network page may commence earlier, and generated portions may be sent earlier to a client for rendering. By using a multipart-encoded data stream, one connection to the data source may be employed for data aggregation for a network page, thereby minimizing connection-related overhead. In the following discussion, a general description of the system and its components is provided, followed by a discussion of the operation of the same.

Figure 1:
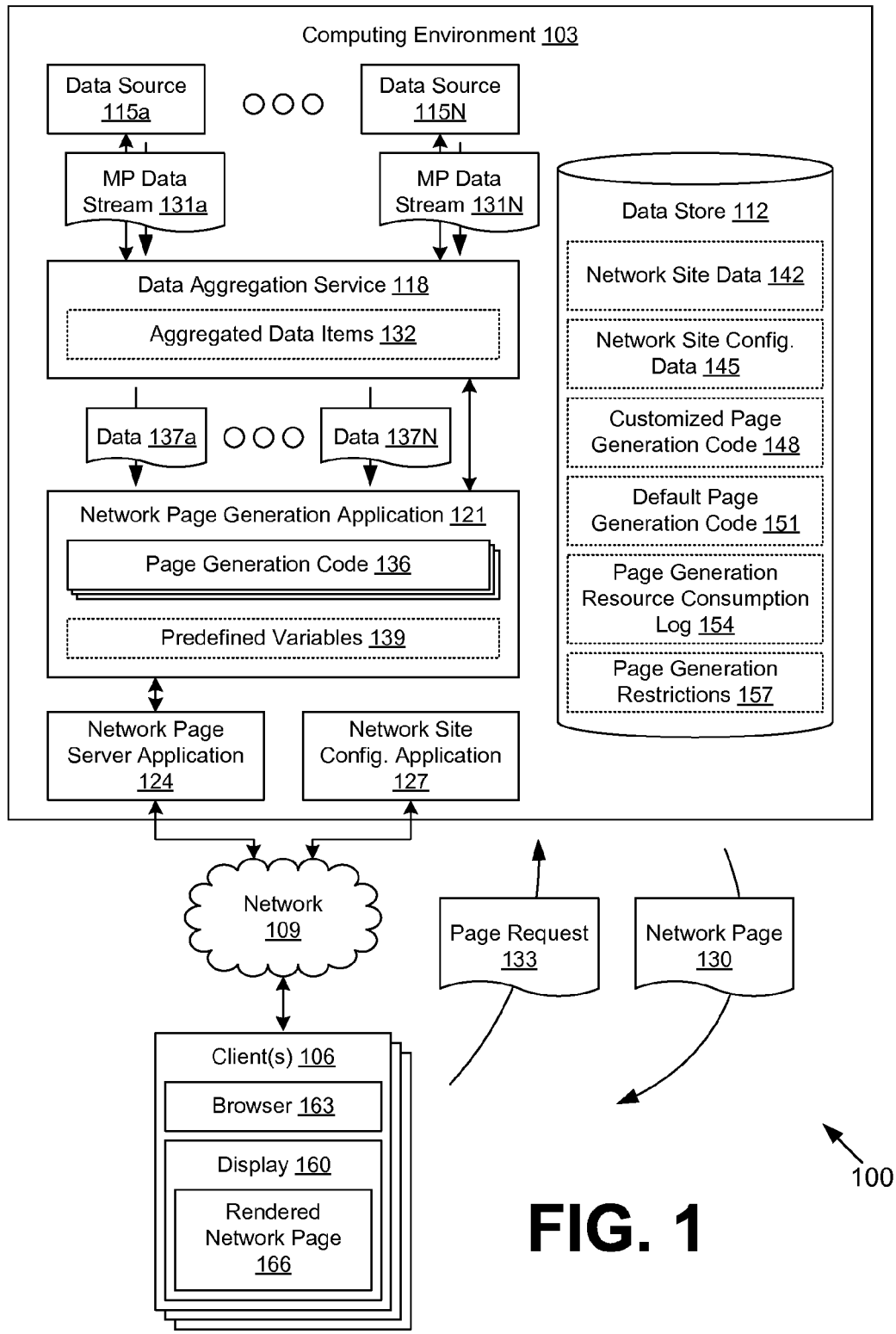
FIG. 1 is a drawing of a networked environment according to various embodiments of the present disclosure.

With reference to FIG. 1, shown is a networked environment 100 according to various embodiments. The networked environment 100 includes a computing environment 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, a plurality of computing devices may be employed that are arranged, for example, in one or more server banks or computer banks or other arrangements. For example, a plurality of computing devices together may comprise a cloud computing resource, a grid computing resource, and/or any other distributed computing arrangement. Such computing devices may be located in a single installation or may be distributed among many different geographical locations. The computing environment 103 may be operated by a hosting provider to host network sites for various customers.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112, for example, is associated with the operation of the various applications and/or functional entities described below.

The components executed by the computing environment 103, for example, include a plurality of data sources 115a . . . 115N, a data aggregation service 118, a network page generation application 121, a network page server application 124, a network site configuration application 127, and other applications, services, processes, systems, engines, or functionality not discussed in detail herein. The data sources 115 are executed to provide various data used in generating network pages 130 for network sites of customers of the hosting provider. Where the customers are merchants, the data provided by the data sources 115 may relate to electronic commerce data such as, for example, item catalog data, item suggestions data, shopping cart data, checkout data, order data, and so on. In one embodiment, the data sources 115 may comprise web services. In another embodiment, the data sources 115 may comprise files or other forms of data stores.

Each of the data sources 115 is configured to provide data to the data aggregation service 118 by way of a respective multipart data stream 131$a$ . . . 131N. The multipart data stream 131 facilitates sending data items, or chunks of data, which are separated by a delimiter, to the data aggregation service 118. The multipart data stream 131 may use a multipart encoding such as that used in multipurpose Internet mail extensions (MIME) or another multipart encoding. The data aggregation service 118 is able to recover the individual data items using the delimiter and is able to begin processing of the data items without necessarily receiving all of the data items from a particular data source 115.

The data aggregation service 118 is executed to aggregate data from the data sources 115 for use in generation of network pages 130. The data aggregation service 118 may employ parallel fetching to reduce latency when data is aggregated from multiple data sources 115. The data aggregation service 118 recovers aggregated data items 132 from the multipart data streams 131. When all of the aggregated data items 132 are received which are used in generating a particular portion of the network page 130, generation of that particular portion of the network page 130 may be initiated, even if all of the aggregated data items 132 used in generating the network page 130 have not yet been received. Thus, generation of at least a portion of the network page 130 may commence using a data item from a multipart data stream 131, even though data is still being received through the multipart data stream 131 for use in generating the network page 130.

The network page generation application 121 is executed to generate the network pages 130 in response to page requests 133 obtained from clients 106. The network pages 130 may correspond to web pages, gopher pages, mobile application screens, and/or other forms of network content. Where the customer is a merchant, the network pages 130 may correspond to home pages, catalog pages, item detail pages, shopping cart pages, checkout pages, order confirmation pages, and so on. Such network pages 130 may facilitate selecting items for purchase, rental, download, lease, or other form of consumption. In addition, where the customer is a merchant, the network page generation application 121 may include, or be in communication with, an electronic commerce system that performs various backend functions in order to facilitate the online purchase of items.

The network page generation application 121 may execute page generation code 136 in order to generate the network pages 130. The page generation code 136 may correspond to a default version supplied by the hosting provider or may correspond to a customized version supplied by the customer. In some cases, the page generation code 136 may be transformed or compiled from one code format to another and/or may be interpreted. As a non-limiting example, the page generation code 136 may correspond to JavaServer Pages (JSPs), which may be compiled into Java® servlets, which in turn may be compiled into bytecode which may be executable by the network page generation application 121. To this end, the network page generation application 121 may include a servlet container such as Apache® Tomcat® or another servlet container. Multiple sets of page generation code 136 may be employed for generating various portions of the network page 130. The portions may correspond to hypertext markup language (HTML) code, extensible markup language (XML) code, and/or other data. In one embodiment, various portions of the network page 130 may be assigned to predefined locations, or slots, in the network page 130.

The network page generation application 121 may be configured to obtain the aggregated data items 132 from the data aggregation service 118 as data 137$a$ . . . 137N and to provide the data 137 to the page generation code 136, for example, as a set of predefined variables 139 or by another approach. The aggregated data items 132 may be aggregated in response to the page request 133. In one embodiment, the data aggregation service 118 may stream the aggregated data items 132 as they are received to the network page generation application 121 as the data 137 in a multipart data stream 131. The network page generation application 121 may act as a "sandbox" for the page generation code 136 to enforce restrictions on application programming interface (API) calls, access to the data source 115, and/or other resources in the computing environment 103.

The network page server application 124 is configured to obtain the page requests 133 from the client 106 over the network 109, to generate network pages 130 in response to the page requests 133 using the network page generation application 121, and to return the network pages 130 to the client 106 by way of the network 109. The network page server application 124 may correspond to a commercially available hypertext transfer protocol (HTTP) server such as, for example, Apache® HTTP Server, Apache® Tomcat®, Microsoft® Internet Information Services (IIS), and/or other servers.

The network site configuration application 127 is executed to facilitate customer configuration of network sites. To this end, the network site configuration application 127 may enable uploading and configuration of the page generation code 136, configuration of various parameters associated with the operation of the network site, order fulfillment management, item catalog management, and/or other functionality. The network site configuration application 127 may implement an HTTP server, a web-based distributed authoring and versioning (WebDAV) server, a file transfer protocol (FTP) server, and/or other servers.

The data stored in the data store 112 includes, for example, network site data 142, network site configuration data 145, customized page generation code 148, default page generation code 151, a page generation resource consumption log 154, page generation restrictions 157, and potentially other data. The network site data 142 corresponds to data used in the generation of the network pages 130 for the hosted network sites of the merchants or other customers. Such data may include, for example, templates, HTML, XML, cascading style sheets (CSS), text, images, audio, video, animations, and/or other data.

The network site configuration data 145 may store parameters and/or other data for controlling the operation and appearance of the hosted network site. Such data may control various electronic commerce functionality such as, for example, item catalogs, item taxonomies, item searching, item recommendations, shopping carts, checkout, order fulfillment, and/or other functionality. The customized page generation code 148 corresponds to page generation code 136 which is created or customized by merchants or other customers. The default page generation code 151 may correspond to a default set of page generation code 136 for a merchant or other customer to use for a base functionality for a network site. The default page generation code 151 may generate network pages 130 having, for example, a default appearance and behavior for a generic electronic commerce site.

The page generation resource consumption log 154 may indicate the computing resources consumed by the page generation code 136 and/or the network page generation application 121 in generating network pages 130 for customer network sites. The page generation restrictions 157 may configure various restrictions to be placed on the page generation code 136 by the network page generation application 121. As a non-limiting example, where the page generation code 136 corresponds to JSP code, the network page generation application 121 may restrict the JSP code from including scriptlets and/or various API calls. Various functionality may be whitelisted or blacklisted, as the case may be. Such restrictions may be configured by way of parameters in the page generation restrictions 157.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 160. The display 160 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a browser 163 and/or other applications. The browser 163 may be executed in a client 106, for example, to access and render network pages 130 served up by the computing environment 103 and/or other servers, thereby generating a rendered network page 166 on the display 160. The client 106 may be configured to execute applications beyond the browser 163 such as, for example, code development applications, file transfer applications, mobile applications, email applications, instant message applications, and/or other applications.

Next, a general description of the operation of the various components of the networked environment 100 is provided. To begin, a merchant or other customer of a hosting provider associated with the computing environment 103 configures a network site to be hosted through the computing environment 103. The network site may have a common domain that is shared by multiple customers of the hosting provider, or the network site may correspond to a unique domain for each customer. The merchant or other customer may adopt default page generation code 151 for various network pages 130 accessible through the network site. Alternatively, or additionally, the merchant or other customer may create customized page generation code 148 for generating some or all of the network pages 130 accessible through the network site.

The merchant or other customer may interact with the network site configuration application 127 to customize or make changes to the network site. In various cases, the customer may edit the page generation code 136 directly through the network site configuration application 127, or the customer may upload replacement page generation code 136. Through this system, customers are able to control generation of network pages 130 for their network sites, despite using a hosted infrastructure and potentially a hosted electronic commerce platform. It is noted that multiple sets or files of page generation code 136 may be used to generate respective portions of a single network page 130. It may be the case that a particular set or file of page generation code 136 configures the generation of the entirety of the network page 130 by designating predefined locations for portions to be generated by other sets or files of page generation code 136.

The page generation code 136 is able to access the predefined variables 139 generated by the data aggregation service 118. In some cases, the page generation code 136 may declare various data that it accesses, which is then aggregated by the data aggregation service 118. In other cases, the data aggregation service 118 may provide a standard set of data from the data sources 115. The set of data may depend on the type of network page 130, e.g., whether the network page 130 is a checkout page, catalog page, order confirmation page, and so on. In one example, the predefined variables 139 may be associated with the hosted electronic commerce platform provided by the hosting provider.

The predefined variables 139 may be provided to the page generation code 136 by way of variables such as implicit variables or other variables that are available in the scope of the page generation code 136. The page generation code 136 may be configured to use all of the predefined variables 139 or a subset of the predefined variables 139. The page generation code 136 may be restricted from accessing the data sources 115 directly. In some embodiments, the page generation code 136 is not executed until all of the aggregated data items 132 corresponding to the predefined variables 139 have been obtained and are available.

In operation, the client 106 sends a page request 133 to the network page server application 124 for a network page 130 from a network site of a customer. The network site is hosted on behalf of the customer by the hosting provider who operates the computing environment 103. Where the customer is a merchant, the hosting provider may operate a hosted electronic commerce platform in conjunction with the computing environment 103. The page request 133 is provided to the network page generation application 121, which then obtains the aggregated data items 132 from the data aggregation service 118. The aggregation may be performed by the data aggregation service 118 automatically in response to the page request 133 or in advance of the page request 133. The data aggregation service 118 fetches the aggregated data items 132 from one or more data sources 115 using one or more multipart data streams 131.

The page generation code 136 for the requested network page 130 is executed by the network page generation application 121. The network page generation application 121 facilitates access to the predefined variables 139 by the page generation code 136. The page generation code 136 generates the network page 130 or portions of the network page 130, and the network page server application 124 serves up the network page 130 to the client 106 in response to the page request 133. Serving of the network page 130 to the client 106 may begin even while portions of the network page 130 remain to be generated.

In some embodiments, the page generation code 136 is restricted from accessing one or more of the data sources 115. The customer-supplied page generation code 136 may be isolated from one or more of the data sources 115 for purposes of complying with PCI DSS and/or other security standards. Consequently, the data from the data sources 115 may be accessible only as predefined variables 139 provided using the aggregated data items 132 from the data aggregation service 118. It is noted that the data aggregation service 118 may obtain the aggregated data items 132 in response to the page request 133, in response to other events, or at other times as desired.

The page generation code 136 may be analyzed for compliance with one or more policies according to the page generation restrictions 157 when initially configured or compiled and/or at runtime. Such policies may include acceptable content of the network page 130, API usage, usage of scriptlets or other disallowed language features, and so on. If the page generation code 136 is determined to be non-compliant, the page generation code 136 may be unexecuted, terminated if already executing, replaced with default page generation code 151, or another action may be taken.

In one embodiment, the page generation code 136 may be executed in an elastic computing resource, which can expand and contract with respect to computing capacity in response to demand for the capacity by the page generation code 136. Such usage may be monitored or metered for billing and/or other purposes. To this end, the elastic computing resource usage may be recorded in the page generation resource consumption log 154. This recognizes that page generation code 136 for some customers may be more computing resource intensive than page generation code 136 for other customers. Accordingly, an elastic amount of resources may be provided such that the customer is billed for what is used in terms of machine instances, memory, processor time, disk space, and/or other resources that are allocated for the customer.

Figure 2:
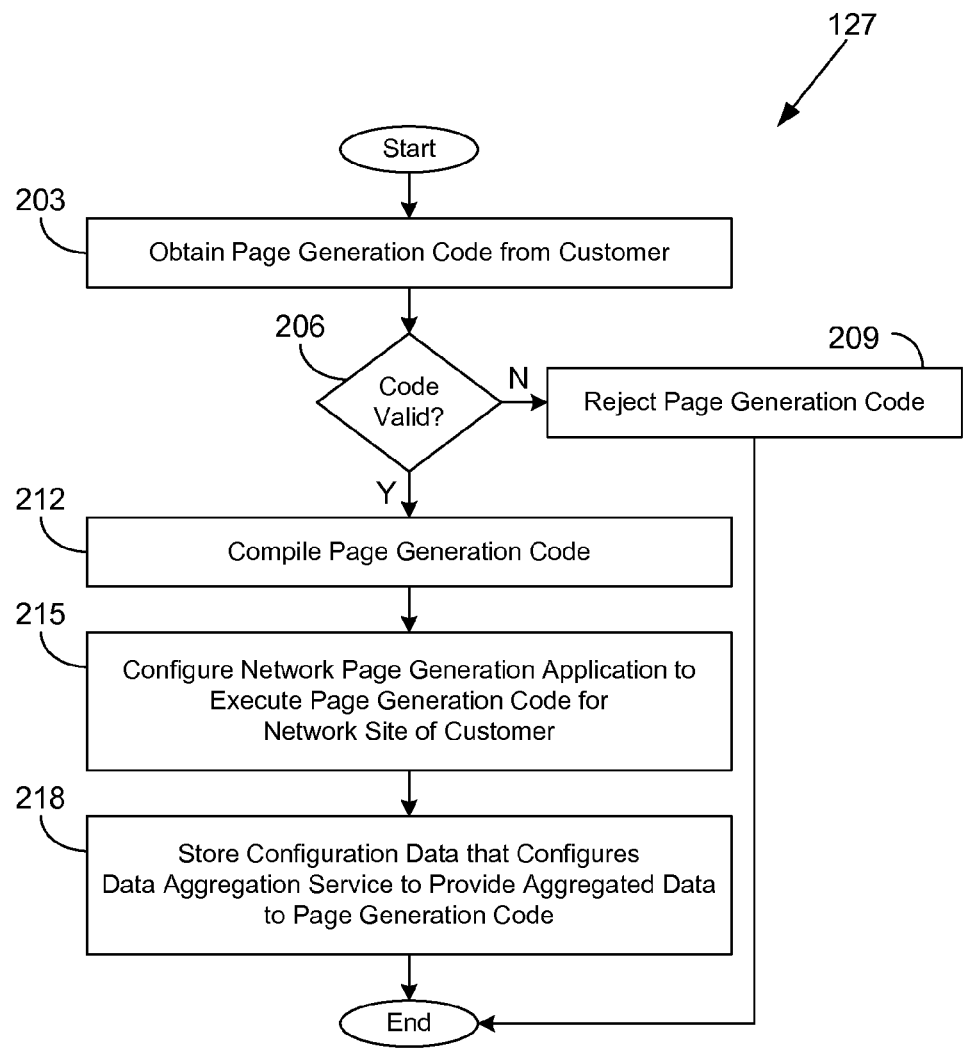
FIG. 2 is a flowchart illustrating one example of functionality implemented as portions of a network site configuration application executed in a computing environment in the networked environment of FIG. 1 according to various embodiments of the present disclosure.

Referring next to FIG. 2, shown is a flowchart that provides one example of the operation of a portion of the network site configuration application 127 according to the embodiments discussed in connection with FIG. 1. It is understood that the flowchart of FIG. 2 provides merely an example of the many different types of functional arrangements that may be employed to implement the operation of the portion of the network site configuration application 127 as described herein. As an alternative, the flowchart of FIG. 2 may be viewed as depicting an example of steps of a method implemented in the computing environment 103 (FIG. 1) according to one or more embodiments.

Beginning with box 203, the network site configuration application 127 obtains page generation code 136 (FIG. 1) from a customer whose network site is hosted by the hosting provider who operates the computing environment 103. The network site configuration application 127 may be configured to authenticate a client 106 (FIG. 1) associated with the customer. In box 206, the network site configuration application 127 determines whether the page generation code 136 is valid. If the page generation code 136 is not valid, the network site configuration application 127 rejects the page generation code 136 in box 209. An error may be presented to the customer. Thereafter, the portion of the network site configuration application 127 ends.

If the page generation code 136 is valid, the network site configuration application 127 proceeds from box 206 to box 212. Even assuming that the page generation code 136 is determined to be valid by the network site configuration application 127, validity checks may still need to be performed by the network page generation application 121 (FIG. 1) at runtime. In box 212, the network site configuration application 127 compiles the page generation code 136. For example, the network site configuration application 127 may compile the page generation code 136 from a JSP into a servlet. The resulting servlet code may also be compiled into bytecode for execution by a Java® Virtual Machine (JVM) or directly by a processor circuit of the computing environment 103.

In box 215, the network site configuration application 127 configures the network page generation application 121 to execute the compiled page generation code 136 for one or more network pages 130 (FIG. 1) for the network site of the customer. In box 218, the network site configuration application 127 may store configuration data that configures the data aggregation service 118 (FIG. 1) to provide a set of predefined variables 139 (FIG. 1) to the page generation code 136. Thereafter, the portion of the network site configuration application 127 ends.

Figure 3:
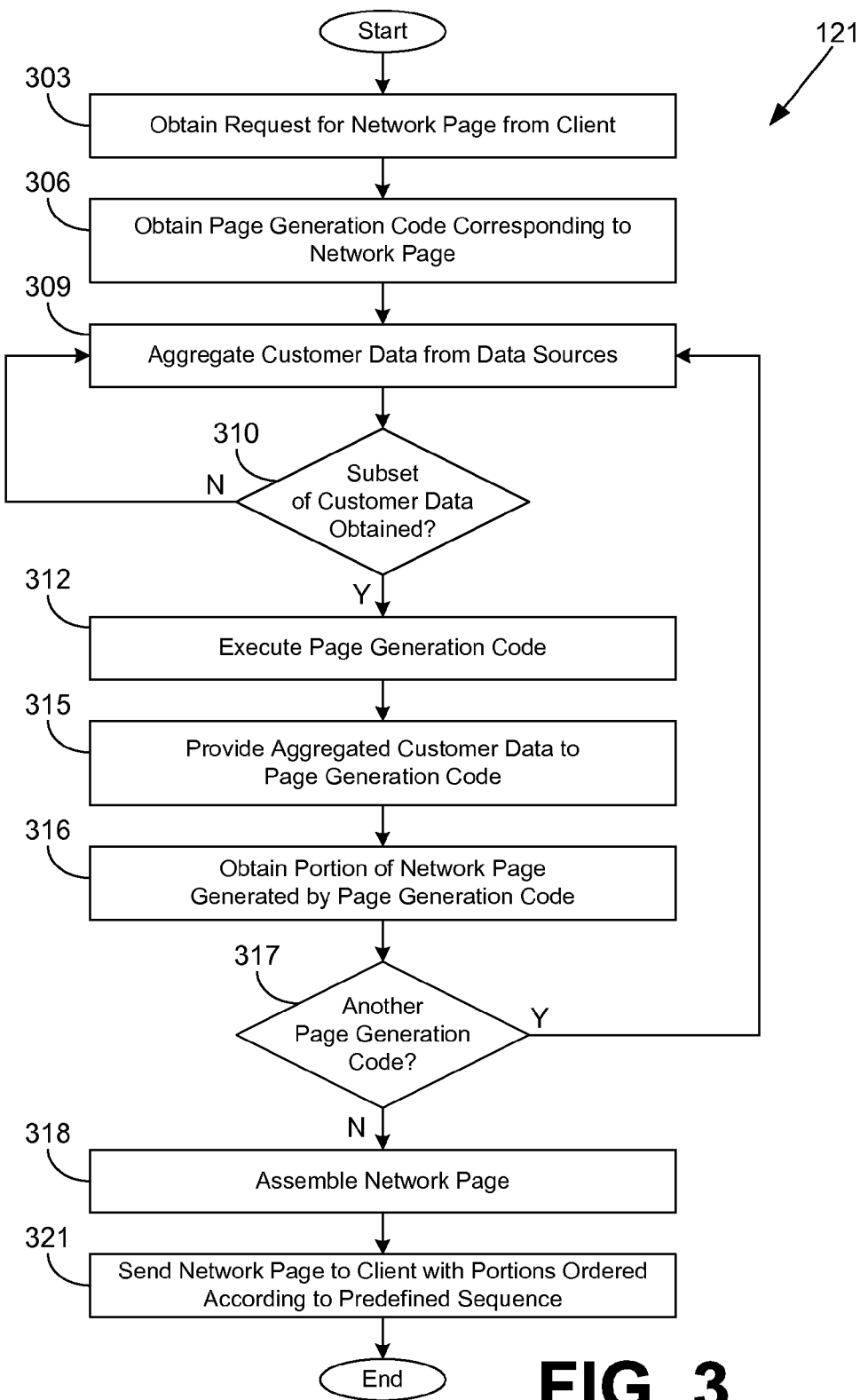
FIG. 3 is a flowchart illustrating one example of functionality implemented as portions of a network page generation application executed in a computing environment in the networked environment of FIG. 1 according to various embodiments of the present disclosure.

Continuing on to FIG. 3, shown is a flowchart that provides one example of the operation of a portion of the network page generation application 121 according to the embodiments discussed in connection with FIG. 1. It is understood that the flowchart of FIG. 3 provides merely an example of the many different types of functional arrangements that may be employed to implement the operation of the portion of the network page generation application 121 as described herein. As an alternative, the flowchart of FIG. 3 may be viewed as depicting an example of steps of a method implemented in the computing environment 103 (FIG. 1) according to one or more embodiments.

Beginning with box 303, the network page generation application 121 obtains a page request 133 (FIG. 1) from the client 106 (FIG. 1) by way of a network page server application 124 (FIG. 1). The page request 133 indicates a network page 130 (FIG. 1) from a network site of a customer. The network site is hosted by the hosting provider who operates the computing environment 103. In box 306, the network page generation application 121 obtains or fetches page generation code 136 (FIG. 1) corresponding to the requested network page 130.

In box 309, the network page generation application 121 aggregates various data pertaining to the customer from one or more data sources 115 (FIG. 1) by way of the data aggregation service 118 (FIG. 1). To this end, a multipart data stream 131 (FIG. 1) may be established by the data aggregation service 118 with each of the data sources 115. The data aggregation service 118 parses the data items as they are received to produce the aggregated data items 132 (FIG. 1). In one embodiment, the network page generation application 121 may obtain the aggregated data items 132 from the data aggregation service 118 by way of a multipart data stream 131.

In box 310, the network page generation application 121 determines whether all of a subset of customer data has been obtained, where the subset of customer data corresponds to those aggregated data items 132 which are to be provided to a particular set or file of page generation code 136 upon execution. If all of the subset of customer data has not yet been obtained for any of the sets or files of page generation code 136 used to generate the network page 130, the network page generation application 121 returns to box 309 and continues the data aggregation phase. If all of a subset of customer data has been obtained for a particular page generation code 136, the network page generation application 121 proceeds to box 312.

In box 312, the network page generation application 121 executes the page generation code 136. In doing so, the network page generation application 121 may perform various runtime checks to ensure that the page generation code 136 does not include any impermissible code or content. In box 315, the network page generation application 121 provides the aggregated customer data, i.e., the subset of customer data, to the page generation code 136 as predefined variables 139 (FIG. 1). In box 316, the network page generation application 121 obtains the portion of the network page 130 generated by the page generation code 136.

In box 317, the network page generation application 121 determines whether another set or file of page generation code 136 is to be used in generating at least a portion of the network page 130. If another set or file of page generation code 136 is to be used, the network page generation application 121 returns to box 309 and continues aggregating customer data from the data sources 115. If another set or file of page generation code 136 is not to be used, the network page generation application 121 continues from box 317 to box 318. It is noted that multiple sets or files of page generation code 136 may be executed in parallel in response to the data for the respective page generation code 136 becoming available in box 310.

In box 318, the network page generation application 121 assembles the network page 130 using the output of potentially multiple page generation codes 136 and potentially other data. In box 321, the network page generation application 121 sends the generated network page 130 to the client 106 in response to the page request 133. One or more portions of the network page 130 may be sent to the client 106 before one or more other portions have finished generation. Also, the network page 130 may be sent to the client 106 according to a predefined sequence. In one scenario, a first one of the portions is generated before a second one of the portions, and the second one of the portions is sent to the client 106 before the first one of the portions according to the predefined sequence. Thereafter, the portion of the network page generation application 121 ends.

Figure 4:
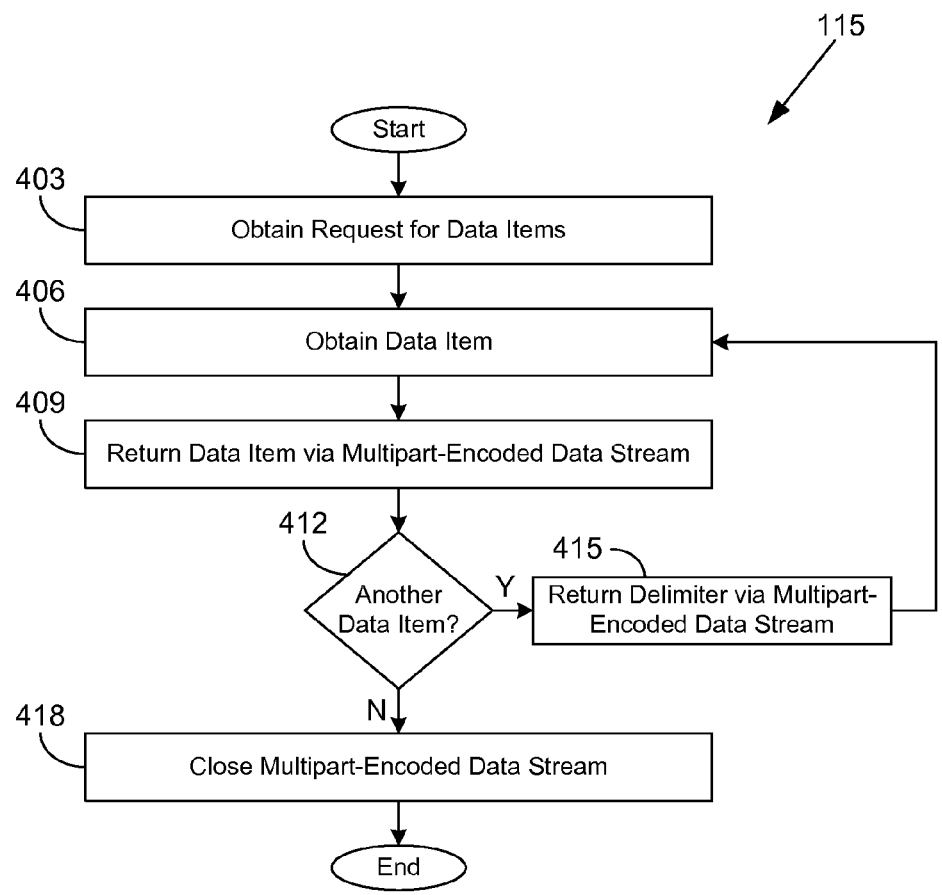
FIG. 4 is a flowchart illustrating one example of functionality implemented as portions of a data source executed in a computing environment in the networked environment of FIG. 1 according to various embodiments of the present disclosure.

Turning now to FIG. 4, shown is a flowchart that provides one example of the operation of a portion of the data source 115 according to the embodiments discussed in connection with FIG. 1. It is understood that the flowchart of FIG. 4 provides merely an example of the many different types of functional arrangements that may be employed to implement the operation of the portion of the data source 115 as described herein. As an alternative, the flowchart of FIG. 4 may be viewed as depicting an example of steps of a method implemented in the computing environment 103 (FIG. 1) according to one or more embodiments.

Beginning with box 403, the data source 115 obtains a request for data items from the data aggregation service 118 (FIG. 1). In various embodiments, the request may correspond to a service call sent by way of simple object access protocol (SOAP), hypertext transfer protocol (HTTP), or some other approach. In box 406, the data source 115 obtains one of the requested data items. The data source 115 may perform internal processing to generate the data item or may obtain the data item from one or more other sources, etc. In box 409, the data source 115 returns the data item to the data aggregation service 118 via a multipart data stream 131 (FIG. 1).

In box 412, the data source 115 determines whether another data item is to be produced in response to the request. If another data item is to be produced, the data source 115 moves to box 415 and returns a delimiter via the multipart data stream 131. The data source 115 then returns to box 406 and obtains another data item. It is noted that the data items may be sent by the data source 115 in any order.

If another data item is not to be produced, the data source 115 closes the multipart data stream 131 in box 418. Thereafter, the portion of the data source 115 ends.

Figure 5:
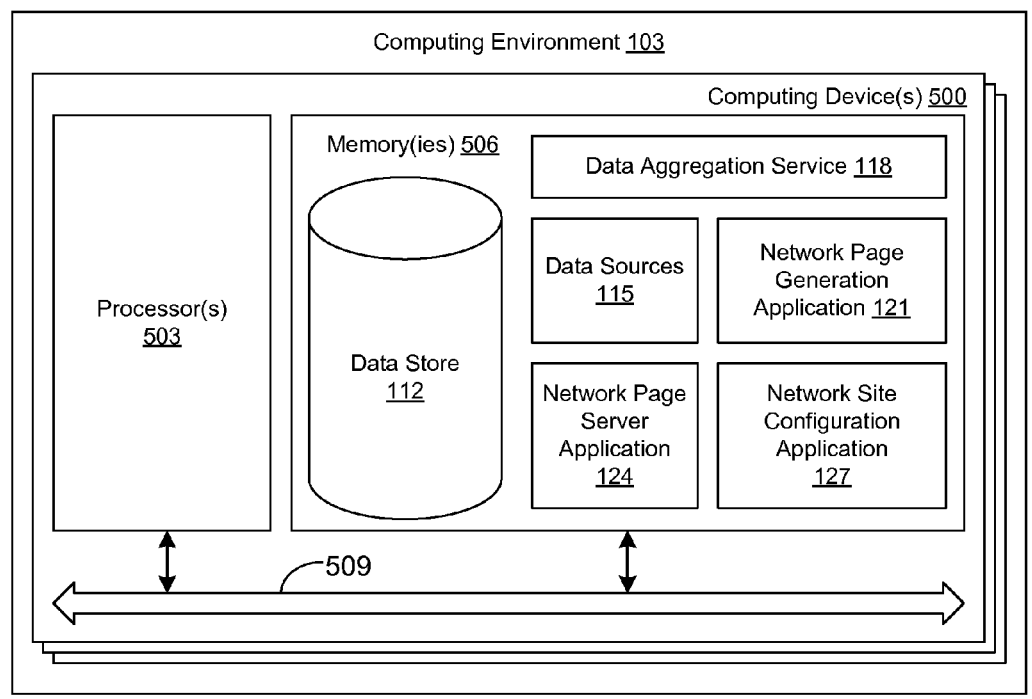
FIG. 5 is a schematic block diagram that provides one example illustration of a computing device employed in the networked environment of FIG. 1 according to various embodiments of the present disclosure.

With reference to FIG. 5, shown is a schematic block diagram of the computing environment 103 according to an embodiment of the present disclosure. The computing environment 103 includes one or more computing devices 500. The computing device 500 corresponds to a representative computing device which may be employed in the computing environment 103.

The computing device 500 includes at least one processor circuit, for example, having a processor 503 and a memory 506, both of which are coupled to a local interface 509. To this end, the computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the data aggregation service 118, the data sources 115, the network page generation application 121, the network page server application 124, the network site configuration application 127, and potentially other applications. Also stored in the memory 506 may be a data store 112 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the data aggregation service 118, the data sources 115, the network page generation application 121, the network page server application 124, the network site configuration application 127, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2-4 show the functionality and operation of an implementation of portions of the network site configuration application 127, the network page generation application 121, and the data source 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 2-4 show a specific order of execution, it is understood that the order of execution may differ from that which is depicted. For example, the order of execution of two or more blocks may be scrambled relative to the order shown. Also, two or more blocks shown in succession in FIGS. 2-4 may be executed concurrently or with partial concurrence. Further, in some embodiments, one or more of the blocks shown in FIGS. 2-4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the data aggregation service 118, the data sources 115, the network page generation application 121, the network page server application 124, and the network site configuration application 127, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system.

In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein, when executed, the program causes the at least one computing device to at least:

in response to receiving a request for a network page from a client, the request indicating a network page associated with a network site of a first party, fetch page generation code supplied by the first party, the network site being hosted by a second party on behalf of the first party;

aggregate first party data from a plurality of data sources, wherein individual ones of the plurality of data sources provide a respective plurality of data items using a respective multipart-encoded data stream;

determine that a subset of the first party data is received, the subset of the first party data corresponding to data items that are provided to the page generation code to generate at least a portion of the network page; and execute the page generation code supplied by the first party to generate the at least a portion of the network page; and facilitate access by the page generation code to the subset of the first party data as a plurality of predefined variables.

2. The non-transitory computer-readable medium of claim 1, wherein, when executed, the program further causes the at least one computing device to at least:

determine whether the page generation code is valid; and take an action in response to determining that the page generation code is not valid, wherein the action includes refraining from executing the page generation code, terminating the page generation code, or replacing the page generation code with default page generation code.

3. The non-transitory computer-readable medium of claim 2, wherein determining whether the page generation code is valid further comprises:

determining whether the page generation code complies with a policy of the second party, the policy defining acceptable content of the network page.

4. The non-transitory computer-readable medium of claim 1, wherein the subset of the first party data includes a first data item from a first individual one of the plurality of data sources and a second data item from a second individual one of the plurality of data sources.

5. The non-transitory computer-readable medium of claim 1, wherein, when executed, the program further causes the at least one computing device to at least:

determine whether second page generation code is to be used to generate at least another portion of the network page;

in response to determining that the second page generation code is to be used, aggregate additional first party data from the plurality of data sources; and execute the second page generation code to generate the at least another portion of the network page.

6. The non-transitory computer-readable medium of claim 5, wherein, when executed, the program further causes the at least one computing device to at least:

send the at least another portion of the network page to the client before the at least a portion of the network page is sent according to a predefined sequence.

7. The non-transitory computer-readable medium of claim 1, wherein the page generation code commences execution before another subset of the first party data is received.

8. The non-transitory computer-readable medium of claim 7, wherein the subset of the first party data includes at least one data item from a first one of the plurality of data sources, and the other subset of the first party data includes at least one data item from a second one of the plurality of data sources.

9. A system, comprising:

at least one computing device; and at least one application executable in the at least one computing device, wherein, when executed, the at least one application causes the at least one computing device to at least:

in response to receiving a request for a network page from a client, the request indicating a network page associated with a network site of a first party, fetch page generation code supplied by the first party, the network site being hosted by a second party on behalf of the first party;

aggregate first party data from at least one data source, wherein individual ones of the at least one data source provide a respective plurality of data items using a multipart encoding;

determine whether a subset of the first party data is received, the subset of the first party data corresponding to data items that are provided to the page generation code to generate at least a portion of the network page;

execute the page generation code supplied by the first party to generate the at least a portion of the network page; and facilitate access by the page generation code to the subset of the first party data as a plurality of predefined variables.

10. The system of claim 9, wherein, when executed, the at least one application further causes the at least one computing device to at least:

execute other page generation code supplied by the first party to generate another portion of the network page in response to receiving another subset of the first party data which is used by the other page generation code; and facilitate access by the other page generation code to the other subset of the first party data as another plurality of predefined variables.

11. The system of claim 9, wherein the page generation code is restricted from accessing the at least one data source directly, and when executed, the at least one application further causes the at least one computing device to at least:

take an action in response to detecting that the page generation code at least attempts to access the at least one data source directly, wherein the action includes refraining from executing the page generation code, terminating the page generation code, or replacing the page generation code with default page generation code.

12. The system of claim 9, wherein the network page comprises a plurality of portions, a first one of the plurality of portions is generated before a second one of the plurality of portions, and when executed, the at least one application further causes the at least one computing device to at least:

send the first one of the plurality of portions to the client before the second one of the plurality of portions has completed generation.

13. The system of claim 9, wherein the network page comprises a plurality of portions, and a first one of the plurality of portions is generated before a second one of the plurality of portions, and when executed, the at least one application further causes the at least one computing device to at least:

send the second one of the plurality of portions to the client before the first one of the plurality of portions according to a predefined sequence.

14. The system of claim 9, wherein the page generation code is executed before another subset of the first party data is aggregated.

15. The system of claim 9, wherein an amount of computing capacity used by the page generation code is monitored and recorded in a page generation code resource consumption log.

16. A method, comprising:

receiving, via at least one of one or more computing devices, a request for a network page from a client, the request indicating a network page associated with a network site of a first party, the one or more computing devices being operated by a second party;

fetching, via at least one of the one or more computing devices, page generation code supplied by the first party;

aggregating, via at least one of the one or more computing devices, first party data from at least one data source, wherein individual ones of the at least one data source provide a respective plurality of data items using a multipart encoding;

determining, via at least one of the one or more computing devices, whether a subset of the first party data is received, the subset of the first party data corresponding to data items that are provided to the page generation code to generate at least a portion of the network page;

executing, via at least one of the one or more computing devices, the page generation code supplied by the first party to generate the at least a portion of the network page; and facilitating, via at least one of the one or more computing devices, access by the page generation code to the subset of the first party data as a plurality of predefined variables.

17. The method of claim 16, wherein the first party is a merchant, the second party is a hosting provider that provides a hosted electronic commerce platform for the network site of the merchant, and the first party data relates to an interaction of the client with the hosted electronic commerce platform.

18. The method of claim 16, wherein the page generation code is isolated from the at least one data source in order to comply with a Payment Card Industry Data Security Standard (PCI DSS).

19. The method of claim 16, wherein the multipart encoding comprises a multipurpose Internet mail extensions (MIME) multipart encoding, and the respective plurality of data items are separated by a delimiter in the multipart encoding.

20. The method of claim 16, further comprising:

executing, via at least one of the one or more computing devices, other page generation code to generate another portion of the network page in response to receiving another subset of the first party data; and providing, via at least one of the one or more computing devices, the other subset of the first party data to the other page generation code as another plurality of predefined variables.

* * * * *